United States Patent
Wartenhorst et al.

(10) Patent No.: US 8,646,411 B2
(45) Date of Patent: Feb. 11, 2014

(54) METHOD AND APPARATUS FOR MILKING ANIMALS HAVING FOUR TEATS

(75) Inventors: Bernard Schulze Wartenhorst, Warendorf (DE); Ralf Wiemann, Hadersalev (DK); Reinhard Frenser, Rheda-Wiedenbrück (DE); Marcelo Alfredo Barba, Alverskirchen (DE)

(73) Assignee: GEA Farm Technologies GmbH, Bönen (DE)

( * ) Notice: Subject to any disclaimer, the term of this patent is extended or adjusted under 35 U.S.C. 154(b) by 15 days.

(21) Appl. No.: 13/327,406

(22) Filed: Dec. 15, 2011

(65) Prior Publication Data

US 2012/0180728 A1    Jul. 19, 2012

Related U.S. Application Data

(62) Division of application No. 12/077,751, filed on Mar. 21, 2008, now abandoned.

(30) Foreign Application Priority Data

Mar. 22, 2007    (DE) .......................... 10 2007 014 457

(51) Int. Cl.
*A01J 5/00*    (2006.01)
(52) U.S. Cl.
USPC ................... 119/14.02; 119/14.15; 119/14.17
(58) Field of Classification Search
USPC .......... 119/14.01, 14.02, 14.08, 14.14, 14.15, 119/14.17
IPC ........................................................... A01J 5/02
See application file for complete search history.

(56) References Cited

U.S. PATENT DOCUMENTS

| | | | | |
|---|---|---|---|---|
| 3,874,337 | A | * | 4/1975 | Umbaugh et al. .......... 119/14.15 |
| 4,344,385 | A | | 8/1982 | Swanson et al. |
| 4,572,104 | A | | 2/1986 | Rubino |
| 5,080,040 | A | | 1/1992 | van der Lely et al. |
| 5,272,997 | A | | 12/1993 | van der Lely et al. |
| 5,275,124 | A | | 1/1994 | van der Lely et al. |
| 5,704,311 | A | * | 1/1998 | van den Berg ............. 119/14.02 |
| 5,957,081 | A | | 9/1999 | van der Lely et al. |
| 6,009,832 | A | * | 1/2000 | Innings et al. ............. 119/14.02 |
| 6,357,387 | B1 | | 3/2002 | Johannesson |
| 7,063,043 | B2 | | 6/2006 | Brown et al. |
| 7,841,296 | B2 | | 11/2010 | Brown et al. |

(Continued)

FOREIGN PATENT DOCUMENTS

| | | | |
|---|---|---|---|
| DE | 29503450 U1 | 4/1995 | |
| DE | 102007014557.3 | 3/2007 | |
| GB | 2143415 A | * 2/1985 | ................ A01J 7/00 |

*Primary Examiner* — Kristen C Hayes
(74) *Attorney, Agent, or Firm* — Smith Law Office (57) ABSTRACT

Apparatus and method for milking animals, comprising a control device (2), four teat cups (6a to 6d), at least one collecting device (11a, 11b) for collecting the extracted milk and a milking line (15) for conveying the milk, said teat cups (6a to 6d) and said at least one collecting device (11a, 11b) and the milking line (15) being interconnected by way of milk lines (10a to 10d, 12a, 12b). A sensor device (13a) is provided and by means of said sensor device (13a) both the milk flow in at least one fore quarter (54, 55) of the udder (53) and the milk flow in at least one rear quarter (56, 57) is captured to separately control the milking operation by fore and rear udder half (58, 59).

11 Claims, 5 Drawing Sheets

(56) References Cited

U.S. PATENT DOCUMENTS

| | | |
|---|---|---|
| 2007/0277737 A1 | 12/2007 | Maier et al. |
| 2009/0007848 A1* | 1/2009 | Wartenhorst et al. ...... 119/14.02 |
| 2010/0058989 A1 | 3/2010 | Ohman et al. |

* cited by examiner

Fig. 4.2 open closed

Fig. 5

METHOD AND APPARATUS FOR MILKING ANIMALS HAVING FOUR TEATS

This application is a divisional of U.S. patent application Ser. No. 12/077,751, filed Mar. 21, 2008, which claims priority to German Application No.: 10 2007 014 457.3, filed Mar. 22, 2007, each of which is incorporated herein by reference in its entirety.

DESCRIPTION

The present invention relates to a method and an apparatus for milking animals having four teats. Although the present invention will now be described with reference to the milking of cows, it may be employed in milking other lactating animals having four teats.

The invention may be employed both in conventional machine milking and in milking in automatic milking systems. Furthermore it is possible for the milking operation to be controlled and optimized by way of detecting and evaluating characteristic parameters and for monitoring or else diagnostics of udder health and analyses of milk constituents to be carried out.

Practical studies have shown considerable variations in the length of milking times between the udder quarters of a cow. The differences observed in the duration of milking of the individual teats of an udder were most frequently between half a minute and three minutes. In individual cases the differences determined were considerably more substantial.

In conventional milking installations the teat cups are placed manually. The four teat cups are placed and milking is started simultaneously for all of the udder quarters and at the end of milking, terminated simultaneously. The milking unit is then removed. All of the four udder quarters are milked for the same length of time.

In present-day milking installations having e.g. an automatic milking-unit removal apparatus, the milk is conveyed to the milking line through a milk flow sensor which detects the entire milk flow intensity of the four teats. This is disclosed in DE 295 03 450 U1. As the milk flow rate falls below a predefined threshold, termination of the milking operation is initiated and all of the teat cups are removed. The milk flow sensor or indicator in this prior art is connected to an electronic control device by means of a control cable, comprising a pneumatic shut-off apparatus for shutting off the milking vacuum at all of the teat cups.

Detecting the milk flow from all of the four teats of a cow's udder by means of only one milk flow sensor and the option of setting the waiting and check times in an electronic control device are standard practice.

As the measured value of the entire milk flow yield intensity falls below a prior defined and set threshold for a pre-set waiting or check time, the electronic control device of the prior art according to DE 295 03 450 U1 emits an activating signal, and the following processes may be triggered:

emit optical/acoustic signals
activate automatic stripping at all of the four teats
shut off the milking vacuum at all of the four teats
automatic removal of the milking unit, etc.

Due to the different milk yields and thus different durations of milking at the four udder quarters, however, in conventional milking installations overmilking will inevitably occur since towards the end of the milking cycle, some udder quarters will as a rule already be milked out while others still give milk. This is because the milking process is terminated only as the milk yield from the remaining udder quarter (or quarters) still providing milk falls below the specified threshold. Before this happens, however, overmilking of the udder quarters already milked out will as a rule occur. This may lead to considerable irritation of the mucosa in the teat and in the udder and thus to inflammation of the udder.

There are further known from the prior art so-called automatic milking systems or robotic milking systems where the individual teat cups are placed automatically and the milking process is controlled separately by quarter. Most of these robotic systems provide for the milk to be conveyed from each teat cup directly to a milking line. One milk flow sensor or indicator per teat cup is as a rule located between the teat cup and the milking line for capturing the milk flow rate or the milk flow intensity of each teat.

As the milk flow intensity of any teat falls below a preset threshold or any preset waiting or check times, an activating signal is emitted by means of which the milking process is terminated for the teat concerned. The teat cups are removed separately from each quarter. One advantage of such a system is the reliable avoidance of overmilking teats. What is a drawback is, however, the considerable technical and financial input into achieving separate detection of the milk flow intensities by quarter or capturing the milk flows and separately controlling the milking system by quarter.

In the milking systems controlled by quarter the milk flow monitoring, capturing of characteristic parameters for controlling/diagnosing udder health etc. require very complex equipment since a corresponding sensor must be provided for each udder quarter.

Therefore it is the object of the present invention to provide a method and an apparatus by means of which the milking operation can be improved while employing a minimum of effort. Advantageously in particular an improvement of the udder health of the animals to be milked is achieved.

This object is solved according to the invention by an apparatus and a method having the features of the independent claims. Advantageous embodiments and specific configurations are the subjects of the subclaims.

The apparatus according to the invention serves for milking animals, comprising a control device, four teat cups, at least one collecting device for collecting the extracted milk and a milking line for conveying the milk, said teat cups and said at least one collecting device and the milking line being interconnected by way of milk lines or milk tubes. At least one sensor device is provided by means of which both the milk flow in at least one fore quarter of the udder and the milk flow in at least one rear quarter is captured to separately control the milking operation by fore and rear udder half.

The apparatus according to the invention has many advantages. It is in particular advantageous that the sensing and controlling steps are reduced by at least half compared to milking controlled by quarter while the quality may be considerably improved compared to conventional milking.

According to the invention, overmilking times are considerably reduced compared to the conventional milking installations described above, while any additional steps for controlling the milking process or for capturing and evaluating e.g. the milk flow of the fore udder or the rear udder are relatively low. Controlling the milking process may even occur in a quality similar to milking controlled by quarter.

Preferably the control device emits at least one first activation signal as the milk flow value captured by the sensor device falls below a defined threshold and a predetermined waiting or check time has elapsed.

The sensor device is particularly preferably adjusted to capture one or a first parameter of the milk flow from a pair of teats of one or the fore udder half, and one or another or second parameter of the milk flow from the pair of teats of the other or the rear udder half.

It has been found that there is a close linear correlation between the duration of milking and the milk yield. The ratio of milk production to the difference in milking times from fore to rear quarters is generally 40:60%. This means that the fore udder half is milked out considerably faster than the rear half. It has been found though that in some cows the rear udder quarters are milked out before the fore quarters.

By contrast, the milking ratios between the two fore quarters or the two rear quarters tend to be very similar or even largely identical.

Thus the invention offers the advantage of achieving a quality comparable to milking controlled by quarter where overmilking times are minimal or absent while the operating steps are drastically reduced. The quality can be enhanced even more since the milk flows from two udder quarters are detected jointly. Consequently the milk flows and thus the measured values obtained increase such that measuring errors are reduced and the milking operation can be controlled more precisely still.

The control device which is in particular electronic can interrupt and/or terminate the milking process separately at the fore and the rear udder halves by emitting activation signals.

Preferably the milk lines between the four teat cups and the at least one collecting device are configured as short milk lines and the at least one milk line between the at least one collecting device and the milking line is configured as a long milk line. There may in particular be provided two collecting devices and two long milk lines, each being allocated to one udder half.

In particular as the invention is employed e.g. in tandem or herringbone milking parlors the flow rate of the milk or the milk flow from the two teat cups of the fore udder half is preferably conveyed through one short milk line each, and the flow rate of the milk from the two teat cups of the rear udder half is preferably conveyed through one short milk line each, to one collecting device from where it is conveyed to a milking line by means of one long milk line.

What is preferred is an apparatus for milking animals having four teats, comprising four teat cups connected to at least one collecting device through short milk hoses, and a milking line for conveying the milk, wherein a sensor device is provided between the teat cups and the milking line for capturing by udder half, separate parameters for the milk flow rate to control separate milking processes at the fore and the rear udder halves. To capture separate parameters by udder half, the milk flows in the two milk lines are preferably captured between the two collecting devices and the milking line. The sensor device comprises in particular exactly two sensor units or sensor devices or sensors. There is in particular provided one sensor each in the two milk lines between the two collecting devices and the milking line.

In all of the configurations at least one collecting device may be configured as a volumetric collecting device. It is conceivable for at least one collecting device to be configured as a Y-piece.

All of the configurations provide in particular that different values are set for the or at least one threshold for controlling the milking process at the fore and the rear udder halves, and for the check and waiting times for the respective udder halves.

Preferably in particular the first threshold is smaller than or equal to 600 g per minute, the preferred range being smaller than or equal to 400 g per minute and larger than or equal to 50 g per minute.

In all of the configurations the waiting or check time is preferably larger than or equal to 5 seconds and smaller than or equal to 120 seconds and in particular larger than or equal to 10 seconds and smaller than or equal to 60 seconds and particularly preferably larger than or equal to 10 seconds and smaller than or equal to 30 and in particular smaller than or equal to 20 seconds.

The first activation signal may be utilized to terminate the milking operation optionally at the fore or the rear udder half.

The first activation signal may be utilized to interrupt or terminate the milking operation at the fore udder quarters with the second activation signal in particular being utilized to interrupt or terminate the milking operation at the rear udder half.

The first activation signal is preferably utilized to interrupt or terminate the milking operation at the rear udder quarters with the second activation signal then being utilized to interrupt or terminate the milking operation at the fore udder half.

Advantageously the milk flow from the fore or the rear udder half is measured by way of at least one sensor device whose signals are utilized to control the milking operation at the fore or the rear udder half. The sensor device is in particular disposed or arranged either on the milking line or in the short milk hose.

It is preferred for the values of the milk flow from the fore udder and the rear udder to be captured separately by means of one sensor device each.

It is also preferred that one sensor device each is employed for capturing the values of the milk flow from one of the fore udder teats and the values of the milk flow from one of the rear udder teats.

Preferably the milk flows from all of the teats of an udder are captured by means of a sensor device.

The sensor devices are in particular provided with one shut-off apparatus each.

After a first activation signal the milking vacuum is shut off by means of a shut-off apparatus, optionally for the pair of teat cups at the fore udder half or for the pair of teat cups at the rear udder half, and milking is terminated at the respective udder half.

By means of a second activation signal the milking vacuum is shut off by means of a shut-off apparatus at the at least one teat cup still placed on the udder and the milking operation is terminated and the apparatus for receiving two pairs of teat cups is pulled from a milking position to a parking position by means of a removal apparatus.

It is in particular conceivable to provide separate stimulation and/or milking and/or stripping for each udder half. For example, stripping may be performed at e.g. 10 pulsations/minute or the teat cup liner opens only once every e.g. 5, 10 or 15 seconds for draining any milk still flowing.

There is in particular provided an apparatus for receiving two pairs of teat cups comprising a supporting arm and a teat cup catching device in which openings for the milk lines are provided wherein the size of said openings is dimensioned so as to provide the four milk lines with sufficient freedom of movement during milking for the four teat cups to be readily placed on the teats even in the case of different distances between teats.

Preferably each pair of teat cups is accommodated on the supporting arm by a flexible connection such that if a pair of teat cups should fall off, the weight of the fallen pair of teat cups is supported by the supporting arm by means of the flexible connection so as to ensure that the milking process can continue at the other pair of teat cups without any substantial changes in milking conditions.

The supporting arm with the teat cup catching device is in particular height adjustable such that the teat cup catching device can be adjusted to the different heights of the cows' udders.

The sensor devices may interact or cooperate with one shut-off apparatus only.

It is possible for the sensor devices to be provided with one shut-off apparatus only.

It is also possible for the sensor device to cooperate with one shut-off apparatus only. One removal apparatus only may be provided.

There is in particular provided at least one pulsator suitable to alternately supply vacuum and atmospheric pressure (or else increased pressure or overpressure, or slightly decreased pressure or a slight vacuum) to the teat cup gaps or pulsation chambers of the teat cups, separate by udder half. The pulsator can in particular provide the pairs of teat cups with different pulsation conditions where different frequencies, pulse cycles, pressure conditions or ratios and pulse conditions or ratios are preferably selected for the fore and the rear udder halves.

The control device is in particular configured to control the milking operation on the basis of at least partially individual basic settings for the respective udder halves wherein in particular at least one basic setting is selected from a group of basic settings comprising, milk flow intensities, pulse frequencies, waiting times, check times, and the like. The control device is in particular suitable to differentiate between the two udder halves of each animal based on its milking history, such that milking can be performed at different settings per udder half.

Preferably at least one pulse hose accommodates an interior shut-off device which may be actuated to aerate or ventilate the pulsation chamber of the associated teat cup to relieve a teat received therein. The shut-off apparatus may be operable manually or else automatically.

The method according to the invention serves for milking animals by employing a control device and four teat cups, and at least one collecting device for collecting the extracted milk wherein a milking line serves to convey the milk. The teat cups and the at least one collecting device, and the milking line are connected to one another by milk lines in which the milk is conveyed. By means of at least one sensor device both the milk flow in at least one fore quarter of the udder and the milk flow in at least one rear quarter of the udder is captured and the milking operation is separately controlled by fore and rear udder half.

Advantageously the control device emits at least one first activation signal as the milk flow value captured by the sensor device falls below a defined and in particular adjustable threshold and a predetermined waiting or check time has elapsed.

Preferably both the threshold for controlling the milking process at the fore and/or rear udder halves, and for the check and waiting times for the respective udder halves can be set at different values.

The threshold is preferably smaller than or equal to 600 g per minute, the preferred range being smaller than or equal to 400 g per minute and larger than or equal to 50 g per minute.

The waiting or check time is preferably larger than or equal to 5 seconds and smaller than or equal to 120 seconds and in particular larger than or equal to 10 seconds and smaller than or equal to 60 seconds and particularly preferably larger than or equal to 10 seconds and smaller than or equal to 20 seconds. As the milk flow falls below the set threshold and does not rise again above the set threshold within the waiting or check time, a (first, second, etc.) activation signal is preferably emitted. In the case that the level then stays below a second (third) threshold value, a second (third) activation signal may be emitted.

The first activation signal is in particular utilized to terminate the milking operation optionally at the fore or the rear udder half. The sequence of terminating may be preset.

The first activation signal is in particular utilized to interrupt or terminate the milking operation at the fore udder quarters with the second activation signal then being utilized to interrupt or terminate the milking operation at the rear udder half.

According to one alternative the first activation signal is preferably utilized to interrupt or terminate the milking operation at the rear udder quarters with the second activation signal then being utilized to interrupt or terminate the milking operation at the fore udder half.

The milk flow from the fore or the rear udder half is in particular captured by way of at least one sensor device and employed to control the milking operation at the fore or the rear udder half. The sensor device may be disposed either on the milking line or in the short milk hose.

The milk flow values from the fore udder or the rear udder are preferably captured by means of one sensor device each.

It is also possible that one sensor device each is employed for capturing the values of the milk flow from one of the fore udder teats or the values of the milk flow from one of the rear udder teats.

The milk flows from all of the teats of an udder can be captured by means of one sensor device.

The sensor devices are in particular equipped with one shut-off apparatus each.

With a first activation signal the milking vacuum can be shut off by means of a shut-off apparatus, optionally for the pair of teat cups at the fore udder half or for the pair of teat cups at the rear udder half, and milking is terminated at the respective udder half.

With a second activation signal the milking vacuum is preferably shut off by means of a shut-off apparatus on the at least one teat cup still placed on the udder and the milking operation is terminated.

The teat cups can be received in an apparatus for receiving two pairs of teat cups and pulled from a milking position to a parking position by means of a removal apparatus.

The apparatus for receiving two pairs of teat cups may comprise a supporting arm and a teat cup catching device in which openings for the milk lines are provided wherein the size of said openings is dimensioned so as to provide sufficient freedom of movement to the four milk lines during milking such that the four teat cups can be readily placed on the teats even in the case of different distances between teats.

The pairs of teat cups are accommodated on the supporting arm by a flexible connection each such that if a pair of teat cups should fall off, the weight of the fallen pair of teat cups is supported by the supporting arm by means of the flexible connection so as to ensure that the milking process can continue at the other pair of teat cups without any substantial changes in milking conditions.

The supporting arm with the teat cup catching device is height adjustable such that the teat cup catching device can be adjusted to the different heights of the cows' udders.

The teat cup catching device accommodates in particular two pairs of teat cups each and advantageously and in a simple way can be adjusted to the different heights of the udders of the animals to be milked by means of a height adjustable and pivotable supporting arm. Teat cup placement is preferably possible on both widely and narrowly distanced teats and on so-called stepped or cascading udders. In case that the milking process is terminated for any pair of teats by shutting off the milking vacuum, a teat cup catching device preferably prevents the respective pair of teat cups from falling down on the milking parlor floor. In case that the milking process is terminated at the second pair of teat cups, they will again preferably fall into a teat cup catching device.

The apparatus for receiving two pairs of teat cups together with said two pairs of teat cups can in particular be pivoted/pulled from a milking position to a parking position by means of a removal apparatus so as to save space. To this end the supporting arm consisting e.g. of an articulated system, may fold up as it is pulled from the milking position to a parking position.

The at least two sensor devices may interact with one shut-off apparatus only and be provided with one shut-off apparatus only.

A removal apparatus may be provided by means of which at least one pair of teat cups is removed.

There is in particular provided at least one pulsator by means of which vacuum and atmospheric pressure or else increased pressure are alternately applied to the teat cup gaps of the teat cups, separate by fore and rear udder half. Different pulsation conditions may in particular be set up wherein preferably different frequencies, pulse cycles, pressure conditions or ratios and pulse conditions or ratios may be selected.

The control device in particular controls the milking operation on the basis of at least partially individual basic settings for the respective udder halves wherein in particular at least one basic setting is selected from a group of basic settings comprising, milk flow intensities, pulse frequencies, waiting times, check times, and the like, with the control device being in particular suitable to differentiate between the two udder halves of each animal based on its milking history, such that milking can be performed at different settings per fore and rear udder half.

At least one pulse hose accommodates an interior shut-off device which may be actuated to aerate or ventilate the pulsation chamber of the respective teat cup to relieve a teat received therein.

A sensor device for determining the flow rate of the milk or of the milk flow intensity is in particular understood to mean herein, milk flow sensors which determine a parameter for the quantity of such milk as flows through the respective milk lines per unit time.

As a rule, the fore udder quarters have shorter phases of decreasing milk flow. According to the invention it is therefore proposed to configure different settings for monitoring the milk flow from the fore and the rear udder quarters. This means that both different thresholds for the milk flow intensities from the fore and the rear udder halves and different waiting or check times before terminating the milking process may be selected.

Thus for example in case that a value momentarily falls below a threshold, the control device which is in particular electronic will not yet emit an activation signal which would cause the milking process to be interrupted or terminated at the respective pair of teat cups. Such activation signal is in particular emitted only when the milk flow stays below the set threshold over a predetermined length of time. Such predetermined length of time may be set to be different for the fore and rear udder quarters in this preferred embodiment.

Since, as indicated above, the fore udder quarters of a cow are usually milked out faster, one may generally set a termination point that is earlier for the fore udder quarters than for the rear udder quarters. Also the time intervals in which the milk flow intensity in the milk lines is detected, may be specified to be separate for the fore and rear udder quarters.

Further, any stripping aids may be actuated or controlled to be different for the fore and the rear teats of the animal. For example a stripping aid may be activated earlier for the fore udder quarters than for the rear udder quarters. Or else it is conceivable to perform stripping in different ways at the fore udder quarters and at the rear udder quarters.

Other configurations may provide only one milk flow sensor for controlling the milking process or milking operation at the fore and rear quarters which captures the milk flow intensity of all four teat cups or teats which is then evaluated in a control device.

The control device which is in particular electronic then preferably provides the option to set at least two separate thresholds for the milk flow intensity and the check and waiting times for each udder half.

For example a first threshold for the fore quarters might be set corresponding to a milk flow of 200 or 300 g/min. and a check or waiting time of 15 or 20 or 25 s, and for the rear quarters, a second threshold of 100 or 200 g/min. and a second check or waiting time of 25 or 30 s.

Recommended setting ranges for the check and waiting times are:
setting range=0-120 s
suitable=5-120 s
preferred=10-30 s
particularly preferred=10-20 s As the milk flow intensity falls below the first threshold and the respective check or waiting time has elapsed, the electronic control device emits a first activation signal. As the milk flow intensity continues falling and falls below the second threshold and the respective check or waiting time has elapsed, the electronic control device emits a second activation signal.

With the first activation signal for example the current providing the pair of teat cups for the fore teats with a pulsed vacuum or atmospheric pressure is cut off from the magnetic coil in the pressure phase. In this way the milking process is interrupted at the fore quarters. The teat cups, however, remain positioned on the teats.

With the second activation signal the milking vacuum is then shut off by means of the shut-off apparatus and the milking process is terminated in that the milking unit is pulled off e.g. by means of a conventional removal apparatus.

A data acquisition system which may be central might control milking processes by animal on the basis of at least partially individual basic settings for each teat cup.

Further advantages and details of the method according to the invention and the apparatus according to the invention will now be explained by way of the embodiments shown in the schematic drawings.

The figures show in:

FIG. 1.1a schematically, an embodiment of a milking apparatus having a removal apparatus, one collecting device each for the fore and rear pairs of teats and two milk flow sensors with a shut-off apparatus each arranged on a milking line;

FIG. 1.1b schematically, a portion of a milking apparatus with two milk flow sensors arranged in the long milk hoses and one shut-off apparatus only disposed on a milking line;

FIG. 1.2 schematically, an apparatus for receiving two pairs of teat cups;

FIG. 1.3 schematically, an embodiment of a milking apparatus having a removal apparatus each for the two pairs of teat cups, one collecting device each for the fore and rear pairs of teats and two milk flow sensors having one shut-off apparatus each arranged on a milking line;

FIG. 1.4a schematically, a portion of a milking apparatus having a 4/2 directional valve, a milk flow sensor disposed on a milking line and two shut-off apparatuses (for systems with two removal apparatuses);

FIG. 1.4b schematically, a portion of a milking apparatus having a 4/2 directional valve, a milk flow sensor disposed on a milking line and two shut-off apparatuses (for systems with one removal apparatus);

FIG. 2.1 schematically, another embodiment of a milking apparatus having one collecting device only for four teat cups and two milk flow sensors disposed in the short milk hoses and one shut-off apparatus only disposed on the milking line;

FIG. 3.1 schematically, another embodiment of a milking device having one collecting device only for four teat cups and one milk flow sensor only having a shut-off apparatus disposed on a milking line;

FIG. 4.1 schematically, another embodiment of a milking apparatus having one collecting device only for four teat cups, two shut-off and ventilating apparatuses disposed in the long pulse hoses and one milk flow sensor only with a shut-off apparatus disposed on a milking line;

FIG. 4.2 an embodiment of a manually operated shut-off and ventilating or aerating apparatus incorporated in the long pulse hose.

With reference to the FIGS. 1.1a and 1.1b a first method according to the invention and an apparatus according to the invention for milking animals 50 having four teats 54 to 57 will be described in detail.

Figure 5:
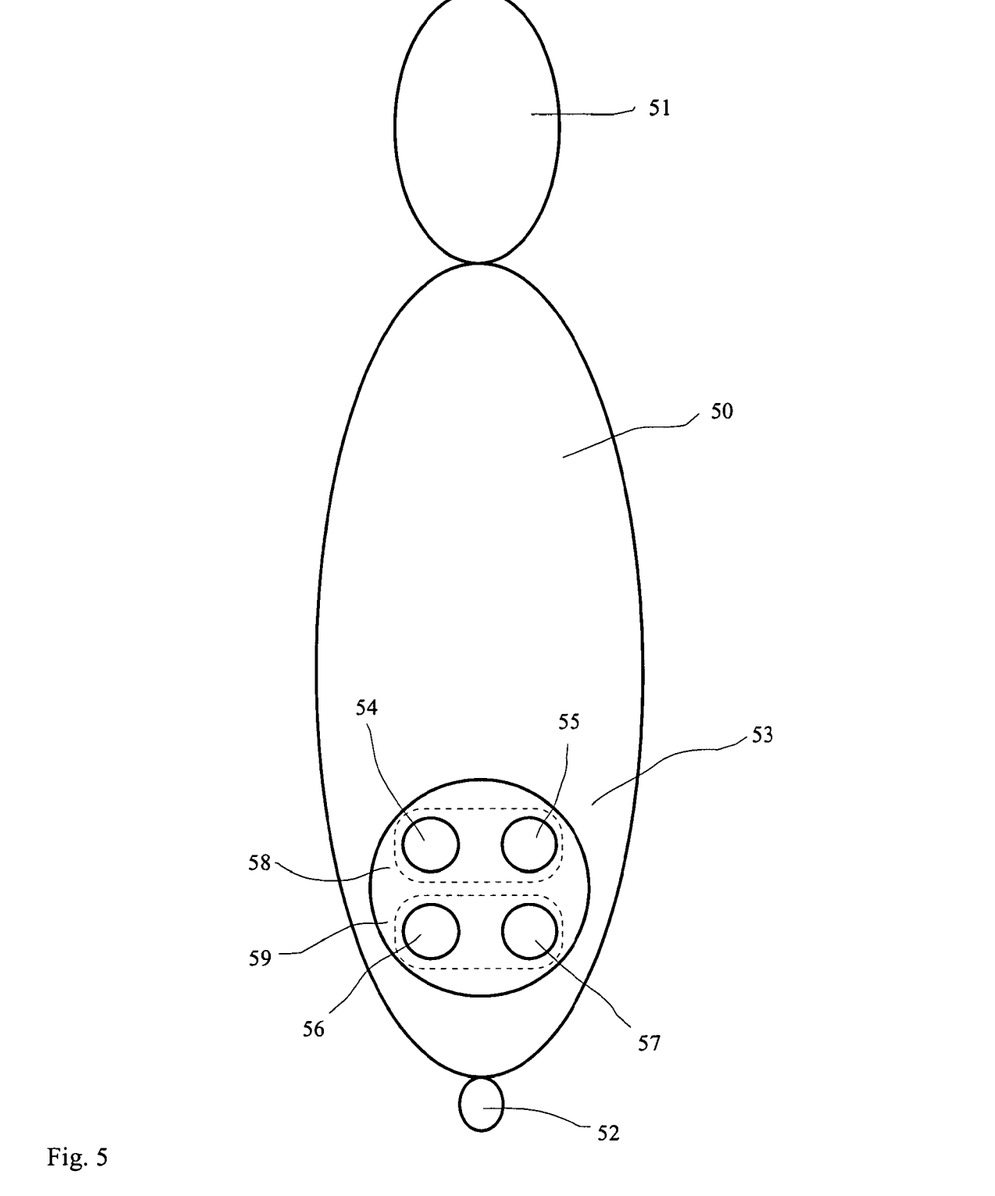
FIG. 5 a schematic illustration of a cow.

A cow 50 with a head 51 and a tail 52 is illustrated in FIG. 5 in a simplistic schematic diagram. The udder 53 comprises, viewed in the longitudinal direction of the cow 50, a fore udder half 58 and a rear udder half 59. The fore quarters 54 and 55 viewed in the longitudinal direction of the cow 50 are disposed closer to the head 51 than are the rear quarters 56 and 57.

FIG. 1.1a shows schematically a first embodiment of an apparatus according to the invention for milking such cows 50. It comprises two pairs of teat cups each with teat cups 6a, 6b and teat cups 6c, 6d which are placed on the teats 54 to 57 of a cow 50 to be milked.

The teat cups 6a, 6b configured as two-chamber teat cups have short pulse hoses 7a, 7b, and the teat cups 6c, 6d, short pulse hoses 7c, 7d connected thereto. By means of a connector 17a the short pulse hoses 7a, 7b are connected to one end of a long pulse hose 5b and the short pulse hoses 7c, 7d, with one end of a long pulse hose 5a by means of a connector 17b.

The long pulse hose 5a is connected at its other end to the connection 3 and the long pulse hose 5b, to the connection 4 of the pulsator 8a.

Preferably during milking the pulsator 8a applies a pulsating atmospheric pressure or vacuum to the pulsation chambers of the teat cups 6a, 6b and the pulsation chambers of the teat cups 6c, 6d. Said application of atmospheric pressure or vacuum periodically folds and opens the liner in the teat cup. With the liner open, this is the suction or milking phase, and with the liner closed, the rest phase.

The pulsating application of atmospheric pressure or vacuum may both cause a stimulation of the cow and stripping of the milk from the individual teats.

The pulsating application of atmospheric pressure or vacuum to the pulsation chambers of the teat cups also ensures that no blood stagnation occurs in the teats.

The extracted milk from the fore quarters is conveyed off the teat cups 6a, 6b by means of the short milk lines 10a, 10b and the milk from the rear quarters, off the teat cups 6c, 6d, by means of the short milk lines 10c, 10d. The two short milk lines 10a, 10b open into a first collecting device configured as a volumetric collecting device 11a and the milk lines 10c, 10d, into a second collecting device configured as a volumetric collecting device 11b. Instead of the volumetric collecting devices 11a and 11b, simple Y-pieces 11c and 11d may be employed.

The collecting devices are for example collecting pieces or claw pieces in which the milk extracted from two pairs of teat cups is joined. Each of said volumetric collecting devices may be provided with sensors for at least one characteristic property such as the milk quality.

The collecting device 11a is followed by a first long milk line 12a and the volumetric collecting device 11b, by a second long milk line 12b. The short milk lines 10a, 10b, 10c, 10d and the long milk lines 12a, 12b are preferably milk hoses which convey the milk from the teat cups 6a, 6b, 6c, 6d to a central milking line 15.

The sensor device 13 comprises two milk flow sensors 13a and 13b. The long milk line 12a is connected to a milk flow sensor 13a and the long milk line 12b, to a milk flow sensor 13b.

By way of providing a sensor device with two milk flow sensors or sensor units 13a and 13b for detecting at least one characteristic each of the milk flow intensity, the operating steps can be quite considerably reduced compared to the apparatuses known from the prior art for milking automatically and by quarter, since the number of sensors is halved.

On the other hand, the udder health is considerably improved over conventional milking systems because separately stripping the milk is possible for the fore and rear teats. Simultaneously the udder quarters 54 to 57 can be milked out completely.

The entire milking operation can thus be adjusted substantially better to each animal 50. In this way, overmilking of the fore and rear teats 54 to 57 can be largely avoided so as to improve the udder health of the herd.

Since in particular the milk streams from the fore quarters and the rear quarters are separately captured and evaluated, the entire milking process can be controlled separately for the fore and rear quarters 54 to 57 and thus the fore and rear halves 58, 59, viewed in the longitudinal direction of the cow.

Thus for example stimulation can be performed purposely differently for the fore and rear udder halves or the fore and rear quarters 54 to 57. The main milking process and stripping aids, if any, may be controlled separately for the fore teats and the rear teats. Control is based on the data of the respective milk flow analyses performed separately.

In milking installations equipped with a herd management system, control may be optionally based on the data history.

Since as a rule the milk flows from the pair of teats of the fore udder half or the fore udder are nearly identical to those from the pair of teats of the rear udder half or the rear udder, one milk flow sensor 13a only is preferably employed for capturing the milk flow from the two fore quarters and one milk flow sensor 13b only for capturing the milk flow from the two rear quarters.

Each of the milk flow sensors 13a, 13b, in the present example disposed on a milking line 15, has one incorporated pneumatic shut-off apparatus 14a, 14b. It is certainly conceivable to employ shut-off apparatuses not incorporated in the milk flow sensors.

The electrodes of the milk flow sensors 13a, 13b, by means of which the milk flow is captured, are connected to the electronic control device 2 by means of control cables 16a, 16b.

In this embodiment the two teat cups 6a, 6b are placed on the fore teats of an animal to be milked. The teat cups 6c, 6d are placed on the rear teats of the animal.

The two long pulse lines 5a and 5b allow to separately apply a vacuum or atmospheric pressure (or slightly increased pressure) to the teat cups 6c, 6d on the one hand or the teat cups 6a, 6b on the other hand.

In the same way the milk extracted from the fore teats can be conveyed off through the long milk line 12a and the milk extracted from the rear teats can be separately conveyed off through the long milk line 12b.

The milk flow sensors 13a, 13b capture the occurring milk flows continuously or at specified time intervals. A different mode may be selected for each milk flow sensor 13a or 13b.

As soon as the milk flow e.g. in the long milk line 12a for fore quarters falls below a predetermined threshold (e.g. 200 g/min.) and a preset waiting or check time has elapsed, an electronic control device 2 emits a first activation signal to the control valve 20a.

Instead of the threshold value of 200 g/min. indicated, other values such as 50, 100, 150 or smaller than 600 g/min may certainly be set.

As soon as the milk flow e.g. in the long milk line 12b for rear quarters falls below a predetermined threshold (e.g. 200 g/min.) and a preset waiting or check time has elapsed, an electronic control device 2 emits a second activation signal to the control valve (20b).

Instead of the threshold value of 200 g/min. indicated, other values such as 50, 100, 150 or smaller than 600 g/min may certainly be set.

There are a number of options depending on the technical equipment of a milking installation to control the subsequent milking process by way of said two activation signals:

A first option provides for cutting off the pulse at the pair of fore teats first and at the rear teats next:

a) In installations not equipped with an automatic milking unit removal apparatus, e.g. the first activation signal activates the control cable 1b such that in the pressure phase the current is cut off in the magnetic coil of the pulsator 8a which applies atmospheric pressure or vacuum to the teat cups of the fore quarters. In this way the long pulse hose 5b and the two short pulse hoses 7a and 7b are aerated or ventilated and thus the rest phase is set, i.e. the liners in the teat cups 6a, 6b fold up, and extraction of milk from the fore teats 54, 55 is interrupted.

Due to a low vacuum present in the liner interior (e.g. ca. 20 kPa) the teat cups 6a, 6b remain in place on the fore teats 54, 55.

While milking continues at the rear quarters 56, 57, the magnetic coil of the pulsator 8a for the pair of fore teats 58 might be turned on/off at set intervals for extracting from the fore teats any milk produced in the fore udder quarters 54, 55 since turn-off.

With the second activation signal and by means of the control cable 1a, the current is cut off in the pressure phase in the magnetic coil of the pulsator (8a) which applies atmospheric pressure or vacuum to the teat cups e.g. of the rear quarters 56, 57. In this way the long pulse hose 5a and the two short pulse hoses 7c and 7d are ventilated and thus the rest phase is set, i.e. the liners in the teat cups 6c, 6d fold up, and extraction of milk from the rear teats 56, 57 is interrupted.

Due to a low vacuum present in the liner interior (e.g. ca. 20 kPa) the teat cups 6c, 6d remain in place on the rear teats 56, 57.

Parallel to the second activation signal an optical (or acoustic) signal could be emitted to indicate to the milker that the milking unit can be taken off.

b) Installations equipped with an automatic removal apparatus 18a provide the option that firstly the pulse is shut off so as to interrupt the milking process at the fore pair of teats 58 and then the milking process is terminated by means of an automatic removal apparatus 18a by taking off all of the teat cups 6a to 6d.

Herein e.g. the first activation signal activates the control cable 1b such that in the pressure phase the current is cut off in the magnetic coil of the pulsator 8a which applies atmospheric pressure or vacuum to the teat cups e.g. of the fore quarters 54, 55, and the milking process at the fore quarters is interrupted. The teat cups 6a, 6b remain in place at the fore quarters, as described above.

With the first activation signal a potentially available stripping aid for the rear quarters may be activated simultaneously or after a delay.

With the second activation signal the control valves 20a, 20b are actuated by means of the control cables 22a, 22b and in this way a vacuum is conveyed to the removal apparatus 18a through the vacuum line 23a, and atmospheric pressure is conveyed to the shut-off apparatuses 14a, 14b through the vacuum lines 9a, 9b. In this way the milking vacuum directed towards the two pairs of teat cups 6a, 6b and 6c, 6d respectively is shut off, and both pairs of teat cups are taken off simultaneously by means of the pulling rope 19a of a conventional removal apparatus 18a. Thus the milking process is terminated.

The term "interrupting the milking process" is understood to mean in the sense of the present application that as preset limits are reached during milking, the teat cup gaps of the teat cups 6a to 6d are supplied with only about atmospheric pressure or increased pressure such that the relevant liners fold up, easing up on the teats. Due to a remaining vacuum in the liner interior or in the teat cup interior, however, the relevant pair of teat cups will remain in place on the teats.

The term "terminating the milking process" is understood to mean in the sense of the present application that as preset limits are reached during milking, the milking vacuum is shut off by means of at least one shut-off apparatus and thus the relevant teat cups fall or are pulled off of the respective teats 54 to 57.

Figure 1:
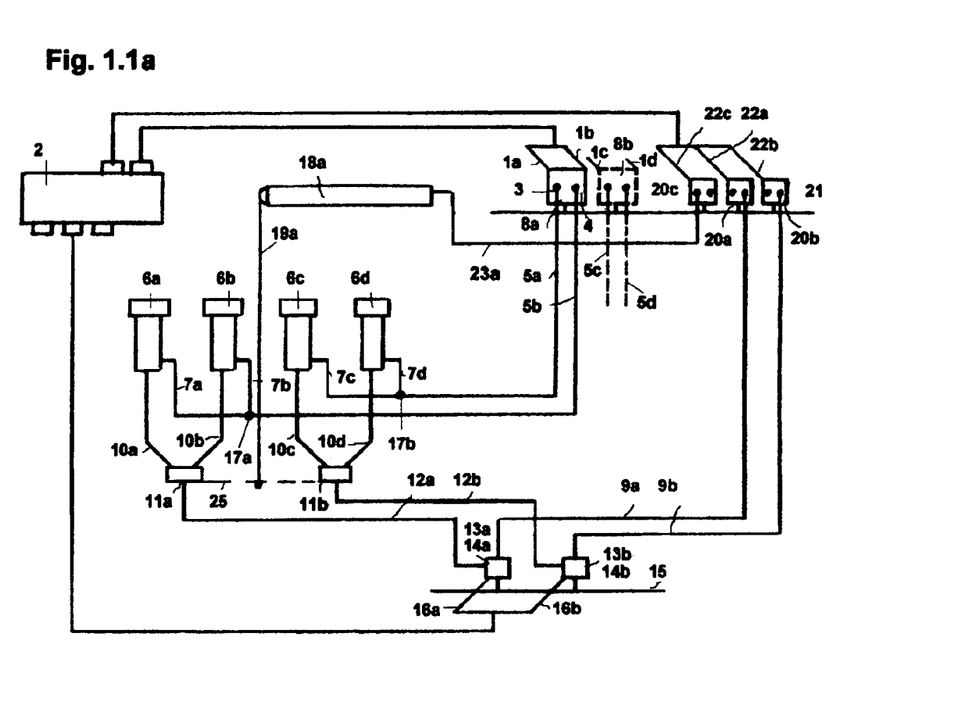
Figures 1, 12:
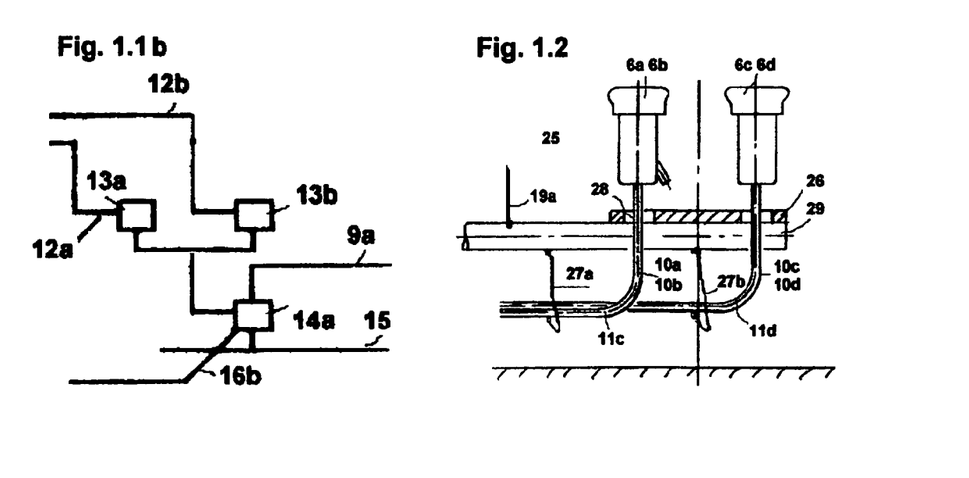

Another option in conjunction with an automatic removal apparatus 18a is to shut off the milking vacuum at the pair of fore teats 54, 55 and then to automatically take off all of the four teat cups 6a to 6d:

In installations having a specific, automatic removal apparatus 18a, the control valve or unit 20a is actuated e.g. with the first activation signal by means of the control cable 22a and atmospheric pressure is conveyed to the shut-off apparatus 14a by means of the vacuum line 9a. In this way the milking vacuum directed towards the pair of teat cups 6a, 6b is shut off and the teat cups fall off e.g. the fore teats 54, 55 into a teat cup catching device 26 (see FIG. 1.2).

With the second activation signal the control valve 20b is actuated by means of the control cable 22b and atmospheric pressure is thus conveyed to the shut-off apparatus 14b through the vacuum line 9b. In this way the milking vacuum directed towards the pair of teat cups 6c, 6d is shut off and the teat cups fall off the rear teats 56, 57 into a special teat cup catching device 26, the function of which will be described further below.

At the same time the control valve 20c is actuated by means of the control cable 22c and vacuum is thus conveyed to the removal apparatus 18a through the vacuum line 23a. In this way both pairs of teat cups are pulled off the removal apparatus 18a by means of a pulling rope 19a. The milking process is terminated.

Different limits for emitting the activation signals may be selected for the fore and rear quarters (e.g. milk flow rate, waiting and check time, etc.).

In another preferred embodiment at least one short or long milk line 10a to 10d or 12, 12b is associated to, or provided inside, a device for analyzing characteristic properties of the extracted milk. In this way the milk may be analyzed as to the milk constituents, flakes, the conductivity of the milk, or other parameters. In this way it is possible to determine the parameters of udder health separately for example for each pair of udder quarters so as to allow an evaluation and sensitivity which are considerably enhanced over the prior art compared to an analysis of the entire milk yield. One can in particular for example perform separate milk analyses for the fore udder quarters 54, 55 and the rear udder quarters 56, 57.

In another embodiment having e.g. two pulsators 8a, 8b the long pulse hoses 5a, 5b, 5c, 5d would be connected directly to the teat cups 6a, 6b, 6c, 6d without the short pulse hoses 7a, 7b, 7c, 7d. There are furthermore provided additional control cables 1c, 1d from the electronic control device 2 to the pulsator 8b.

In this embodiment, pulsation can be configured separately for each teat 54 to 57 (e.g., stimulation, pulse frequency, pulse ratio, etc.).

It should be noted that although it is very well possible in side by side milking parlors to pull off all of the four teat cups 6a, 6b, 6c, 6d simultaneously by means of a conventional removal apparatus 18a, or first the rear pair of teat cups by means of a first conventional removal apparatus 18a and then the fore pair of teat cups by means of a second removal apparatus 18b, in the direction of the milker pit, however one cannot as readily pull off first the fore and then the rear pair of teat cups.

For this reason, an apparatus according to FIG. 1.2 is proposed. FIG. 1.2 shows, schematically, an embodiment according to the invention which ensures that in side by side milking parlors (and also in other milking parlor types) first the fore pair of teat cups 6a, 6b can be taken off without interfering with milking in the rear pair of teat cups 6c, 6d.

This embodiment is an apparatus consisting substantially of a supporting arm 29 and a teat cup catching device 26 for receiving two pairs of teat cups 6a, 6b and 6c, 6d.

The teat cup catching device 26 is provided with openings 28a, 28b, 28c, 28d for the milk lines 10a, 10b, 10c, 10d. The sizes and positions of the four openings 28a, 28b, 28c, 28d are dimensioned so as to provide on the one hand, sufficient freedom of movement for the four milk lines 10a, 10b, 10c, 10d during milking such that the four teat cups 6a, 6b, 6c, 6d can be placed on the teats of a cow even given a wide variety of teat distances, and on the other hand to prevent the pair of teat cups 6a, 6b for the fore teats 54, 55 from falling down on the floor after the milking vacuum has been shut off, while the pair of teat cups 6c, 6d continues milking the rear teats 56, 57.

It is rather intended to achieve that the pair of teat cups at which the milking process is terminated first does fall off the teats but only as far down as the flexible connections 27a, 27b will allow. The weight of the pair of teat cups fallen off is held by the supporting arm 29 by means of the flexible connection 27a, 27b. In this way the milking process at the second pair of teat cups can continue without any change in the milking conditions.

The length of the flexible connection 27a, 27b is selected such that on the one hand the different heights of the teats of a cow's udder are taken into account for attaching the teat cups 6a, 6b, 6c, 6d and on the other hand the teat cups are prevented from falling on the floor. The flexible connection 27a, 27b preferably consists of a chain or a rope.

The supporting arm 29 may consist e.g. of an articulated system or a telescopic arm.

The apparatus 25 for receiving two pairs of teat cups is in particular height adjustable such that it can be adjusted to the different heights of the cows' udders.

As the milking process is terminated both at the rear and the fore udder quarters 54 to 57, both pairs of teat cups together with the apparatus 25 for receiving two pairs of teat cups are pulled from the milking position to a "parking position" either manually or by means of the pulling rope 19a of a removal apparatus 18a. Other configurations for receiving two pairs of teat cups are certainly conceivable as well.

Figure 13:
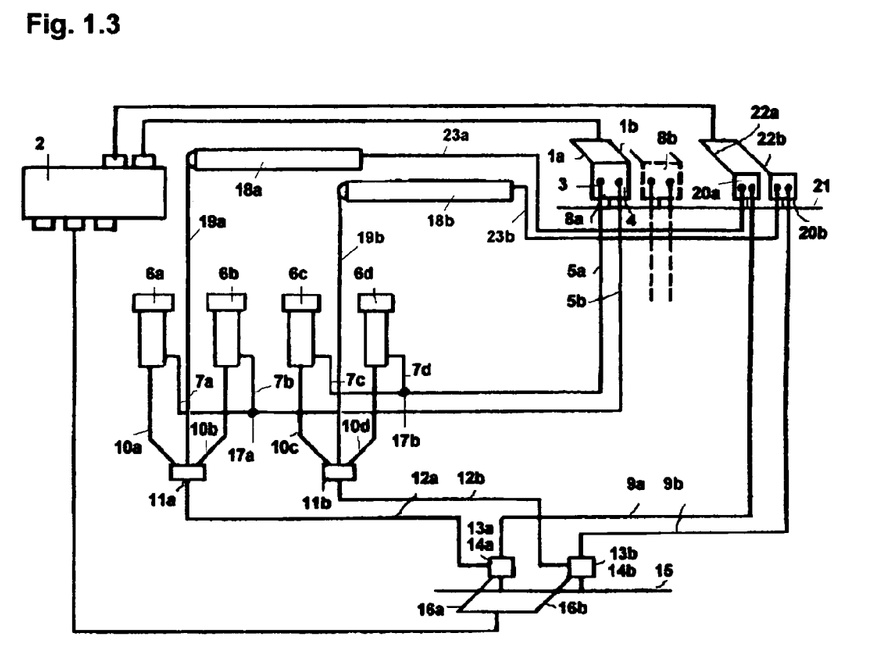

FIG. 1.3 shows a schematic illustration of another embodiment of an apparatus for milking according to the invention. It comprises two pairs of teat cups 6a, 6b and 6c, 6d which are placed on the teats (not shown) of a cow to be milked. Short pulse hoses 7a, 7b are connected to the teat cups 6a, 6b and short pulse hoses 7c, 7d, with the teat cups (6c, 6d). By means of a connector 17a the short pulse hoses 7a, 7b are connected to one end of a long pulse hose 5b, and the short pulse hoses 7c, 7d, to one end of a long pulse hose 5a by means of a connector 17b. The long pulse hose 5a is connected at its other end to the connection 3 and the long pulse hose 5b, to the connection 4 of the pulsator 8a.

The pulsator 8a applies a pulsating atmospheric pressure or vacuum to the pulsation chambers of the teat cups 6a, 6b and the pulsation chambers of the teat cups 6c, 6d. The application of atmospheric pressure or vacuum may both cause a stimulation of the cow and stripping of the milk from the individual teats.

The pulsating application of atmospheric pressure or vacuum to the teat cup gaps 6a to 6d, also referred to as pulsation chambers of the teat cups, also ensures that no blood stagnation occurs in the teats.

The extracted milk from the fore quarters is conveyed off the teat cups 6a, 6b by means of the short milk lines 10a, 10b and the milk from the rear quarters, off the teat cups 6c, 6d, by means of the short milk lines 10c, 10d. The two short milk lines 10a, 10b open into a first collecting device configured as a volumetric collecting device 11a and the milk lines 10c, 10d, into a second collecting device configured as a volumetric collecting device 11b.

The collecting device configured as a volumetric collecting device 11a is followed by a first long milk line 12a and the collecting device configured as a volumetric collecting device 11b, by a second long milk line 12b.

The short milk lines 10a, 10b, 10c, 10d and the long milk lines 12a, 12b are preferably milk hoses which convey the milk from the teat cups 6a, 6b, 6c, 6d to a central milking line 15.

The long milk line 12a is connected to a milk flow sensor 13a and the long milk line 12b, to a milk flow sensor 13b.

Since the milk flows from the pair of teats of the fore udder 58 tend to be nearly identical as are those from the pair of teats of the rear udder 59, one milk flow sensor 13a only is preferably employed for capturing the milk flow from the two fore quarters and one milk flow sensor 13b only for capturing the milk flow from the two rear quarters.

Each of the milk flow sensors 13a, 13b, in the present example disposed on a milking line 15, in particular has one incorporated pneumatic shut-off apparatus 14a, 14b.

The electrodes of the milk flow sensors 13a, 13b, by means of which the milk flow intensity is captured, are connected to the electronic control device 2 by means of control cables 16a, 16b.

In this embodiment the two teat cups 6a, 6b are placed on the fore teats of an animal to be milked. The teat cups 6c, 6d are placed on the rear teats of the animal.

The two long pulse hoses 5a and 5b allow to separately apply a vacuum or atmospheric pressure (or slightly increased pressure) to the teat cups 6c, 6d on the one hand and the teat cups 6a, 6b on the other hand.

In the same way the milk extracted from the fore teats 54, 55 can be conveyed off through the long milk line 12a and the milk extracted from the rear teats 56, 57 can be separately conveyed off through the long milk line 12b.

The milk flow sensors 13a, 13b capture the milk flows continuously or at specified time intervals. A different mode may be selected for each milk flow sensor 13a, 13b.

As soon as the milk flow e.g. in the long milk line 12a for the fore quarters 54, 55 falls below a predetermined threshold (e.g. 200 g/min.) and a preset waiting or check time has elapsed, an electronic control device 2 emits a first activation signal to the control valve 20a.

As soon as the milk flow e.g. in the long milk line 12b for rear quarters 56, 57 falls below a predetermined threshold (e.g. 200 g/min.) and a preset waiting or check time has elapsed, an electronic control device 2 emits a second activation signal to the control valve (20b).

Instead of the threshold values of 200 g/min. indicated above, other values such as 50, 100, 150 or smaller than 600 g/min could certainly be set as well.

When the first activation signal from the electronic control device 2 causes e.g. the control cable 22a to activate the control valve 20a, the latter re-routes. Said re-routing causes atmospheric pressure to be conveyed to the shut-off apparatus 14a by means of the vacuum line 9a and vacuum conveyed to the removal apparatus 18a by means of the vacuum line 23a. In this way the milking vacuum directed towards the pair of teat cups 6a, 6b is shut off and the pair of teat cups 6a, 6b is pulled off the fore teats 54, 55 by means of the pulling rope 19a of the removal apparatus 18a. The milking process at the fore teats is terminated.

When the second activation signal from the electronic control device 2 causes e.g. the control cable 22b to activate the control valve 20b, the latter re-routes. Said re-routing causes atmospheric pressure to be conveyed to the shut-off apparatus 14b by means of the vacuum line 9b and vacuum conveyed to the removal apparatus 18b by means of the vacuum line 23b.

In this way the milking vacuum directed towards the pair of teat cups 6c, 6d is shut off and the pair of teat cups 6c, 6d is pulled off the rear teats by means of the pulling rope 19b of the removal apparatus 18b. The milking process is terminated at the rear teats and thus for the respective cow.

Figure 14:
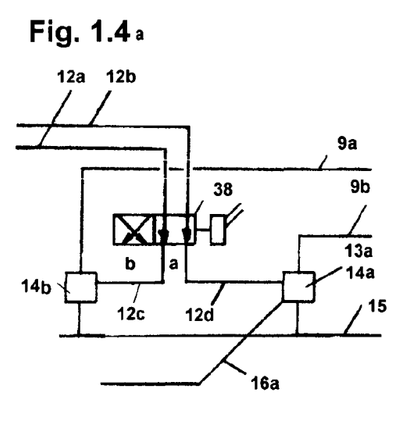

FIG. 1.4a and FIG. 1.4b schematically show an embodiment of a part of another apparatus for milking according to the invention. They differ from the embodiment according to FIG. 1.3 in that instead of the two milk flow sensors 13a, 13b, there are employed only one single milk flow sensor 13a, two shut-off apparatuses 14a, 14b and one switching apparatus in the shape of a 4/2 directional valve 38. The magnetic coil of the 4/2-way or 4/2 directional valve 38 is connected to the electronic control device 2 by means of a control cable, not shown.

The embodiment according to FIG. 1.4a provides for one end each of the long milk lines 12a, 12b to be connected to the inlets of the 4/2 directional valve 38 and one end each of the long milk lines 12c, 12d to be connected to the outlets of the 4/2 directional valve 38 and their second ends, to the inlets of the shut-off apparatuses 14a, 14b.

The embodiment according to FIG. 1.4a requires two removal apparatuses 18a, 18b each, two control valves 20a, 20b and associated control cables 22a, 22b and vacuum lines 9a, 9b.

In conjunction with an apparatus 25 for receiving two pairs of teat cups, this embodiment might provide for the milking process to be terminated by means of the removal apparatuses 18a, 18b as described above, as desired first at the fore or the rear udder half 58, 59, as specific, freely adjustable limits are reached e.g. for the milk flow and a waiting or check time.

The embodiment according to FIG. 1.4b requires only one removal apparatus 18a, one control valve 20a and one associated control cable 22a, and one vacuum line 9a.

For the milk flows in the long milk lines 12a, 12b to be alternately captured by the milk flow sensor 13a, the 4/2 directional valve 38 is rerouted by the control 2 at adjustable time intervals.

The electrodes of the milk flow sensor 13a, by means of which the milk flow of the long milk line 12a is captured, are connected to the electronic control device 2 by means of control cable 16a.

For example as the milk flow in the long milk line 12a falls below the threshold preset for the pair of fore teats (e.g. 200 g/min.) and a preset waiting or check time (e.g. 20 s) for the pair of fore teats has elapsed, the control 2 emits a first activation signal by means of which a) the cyclic rerouting of the 4/2 directional valve 38 is terminated. Said cyclic rerouting of the 4/2 directional valve 38 is terminated precisely in the valve position "a". In this way capturing of the milk flow may continue in the long milk line 12b.

In the case that the actual milk flow or time data would first deviate from the values set for the pair of rear teats in the long milk line 12b, cyclic rerouting of the 4/2 directional valve would be terminated precisely in the valve position "b". In this way capturing of the milk flow may continue in the long milk line 12a.

b) With the first activation pulse generated by the control 2 the pulsation of the pulsator 8a is simultaneously interrupted e.g. at the fore quarters 54, 55 in the rest phase (pulse cut-off). In this way milking is interrupted at the fore quarters. Milking continues, however, e.g. at the rear quarters 56, 57.

c) As in the further course of milking the milk flow in the long milk line 12b falls below a preset threshold (e.g. 200 g/min.) and a preset waiting or check time (e.g. 20 s) for the pair of rear teats has elapsed, the control 2 generates a second control pulse by means of which the control valve 20a reroutes.

In this way atmospheric air is conveyed to the shut-off apparatuses 14a, 14b by means of the vacuum line 9a and vacuum is conveyed to the removal apparatus 18a by means of the vacuum line 23a. This causes the milking vacuum directed towards the teat cups 6a, 6b, 6c, 6d to be shut off and the milking operation to be terminated for the respective animal in that the milking unit or the two pairs of teat cups is/are pulled off.

Figure 21:
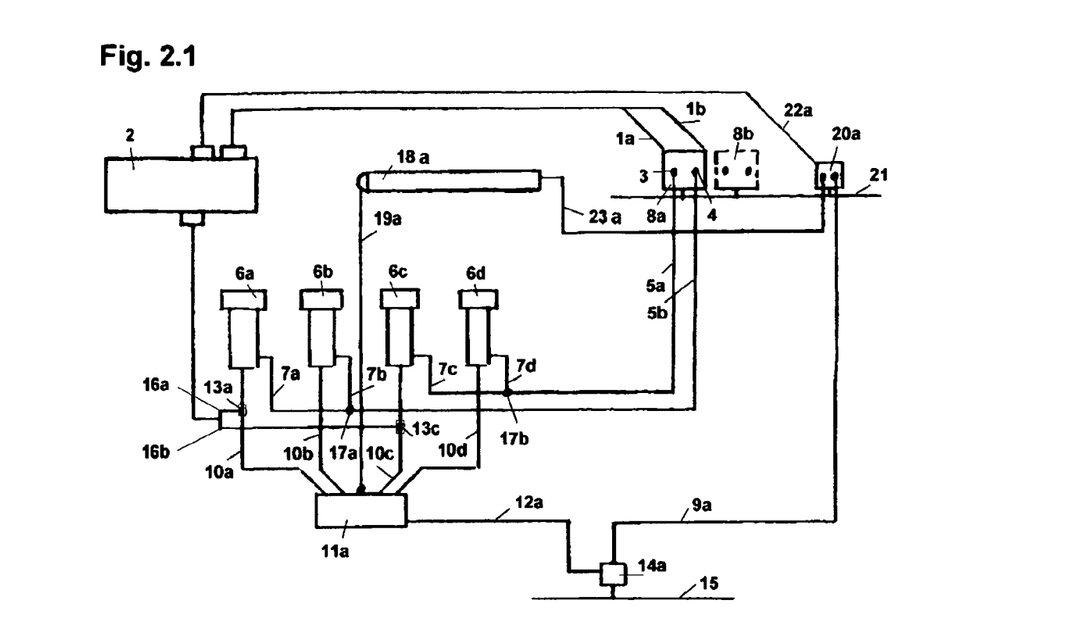

FIG. 2.1 shows a schematic illustration of another embodiment of an apparatus for milking according to the invention. It comprises two pairs of teat cups 6a, 6b and 6c, 6d which are placed on the teats 54 to 57 (not shown) of a cow 50 to be milked. Short pulse hoses 7a, 7b are connected to the teat cups 6a, 6b and short pulse hoses 7c, 7d, to the teat cups 6c, 6d. By means of a connector 17a the short pulse hoses 7a, 7b are connected to a long pulse hose 5b and the short pulse hoses 7c, 7d, to a long pulse hose 5a by means of a connector 17b. The long pulse hose 5a is connected at its other end to the connection 3 and the long pulse hose 5b, to the connection 4 of the pulsator 8a.

The pulsator 8a applies a pulsating atmospheric pressure or vacuum to the pulsation chambers of the teat cups 6a, 6b and the pulsation chambers of the teat cups 6c, 6d, for stimulation and for milking a cow. The application of atmospheric pressure or vacuum may both cause a stimulation of the cow and stripping of the milk from the individual teats. The pulsating application of atmospheric pressure or vacuum to the pulsation chambers of the teat cups 6a to 6d causes movement of the liners.

The extracted milk from the fore quarters 54, 55 is conveyed off the teat cups 6a, 6b by means of the short milk lines 10a, 10b and the milk from the rear quarters 56, 57 off the teat cups 6c, 6d, by means of the short milk lines 10c, 10d. The two pairs of short milk lines 10a, 10b and 10c, 10d open into one collecting device 11a only.

The collecting device 11a is followed by only one long milk line 12a opening into the milk line 15.

In case that the milking installation is equipped with a removal apparatus 18a, then the long milk line 12a is connected to a shut-off apparatus 14a disposed on the milk line 15 through the shut-off apparatus 14a.

By means of the milk flow sensor 13a the milk flow from a fore quarter, e.g. 54, is captured and by means of the milk flow sensor 13c, the milk flow from a rear quarter, e.g. 56. With this method the milk flow from one udder quarter or one teat only is measured. Depending on the measured result, the milking operation is controlled for the fore or rear pair of teats 58, 59.

The milk flow sensors 13a, 13c capture the milk flows continuously or at specified time intervals. A different mode may be selected for each milk line (e.g. 10a, 10c).

The electrodes of the milk flow sensors 13a, 13c, by means of which the milk flow intensity is captured in the short milk lines 10a and 10c, are connected to the electronic control device 2 by means of control cables 16a, 16b.

As soon as the milk flow in the milk line 10a falls below a particularly preferred threshold of e.g. 200 g/min. and a preset waiting or check time has elapsed, an electronic control device 2 emits a first activation signal.

Another preferred threshold might lie between 50 g/min. and 600 g/min. A technically feasible solution for specific tasks such as activating a stripping aid might be a threshold between 50 g/min. and 1,000 g/min. Preferred values are e.g. 50, 100, 150, 200, or smaller than or equal to 600 g/min.

By means of the first activation signal the milking process is then interrupted for the fore quarters 54, 55 by shutting off the respective magnetic coil of the pulsator 8a.

As soon as the milk flow in the milk line 10c falls below a particularly preferred threshold (e.g. 200 g/min.) and a preset waiting or check time has elapsed, a second activation signal for the rear quarters 56, 57 is emitted by an electronic control device 2. The same would be the case if instead of the preferred threshold indicated above, a value of e.g. 100 g/min. to 500 g/min. or of 100 g/min. to 1,000 g/min. had been preset at the electronic control device 2. By means of the second activation signal the milking process is then terminated for all of the four teats by shutting off the milking vacuum by means of the shut-off apparatus 14a and by means of pulling off the teat cups 6a, 6b, 6c, 6d with a conventional removal apparatus 18a.

The method described above also applies in the case that the milk flow of the rear teats 56, 57 first falls below the limits indicated above. In such a case the first activation signal is utilized for controlling the milking process at the rear teats.

Figure 31:
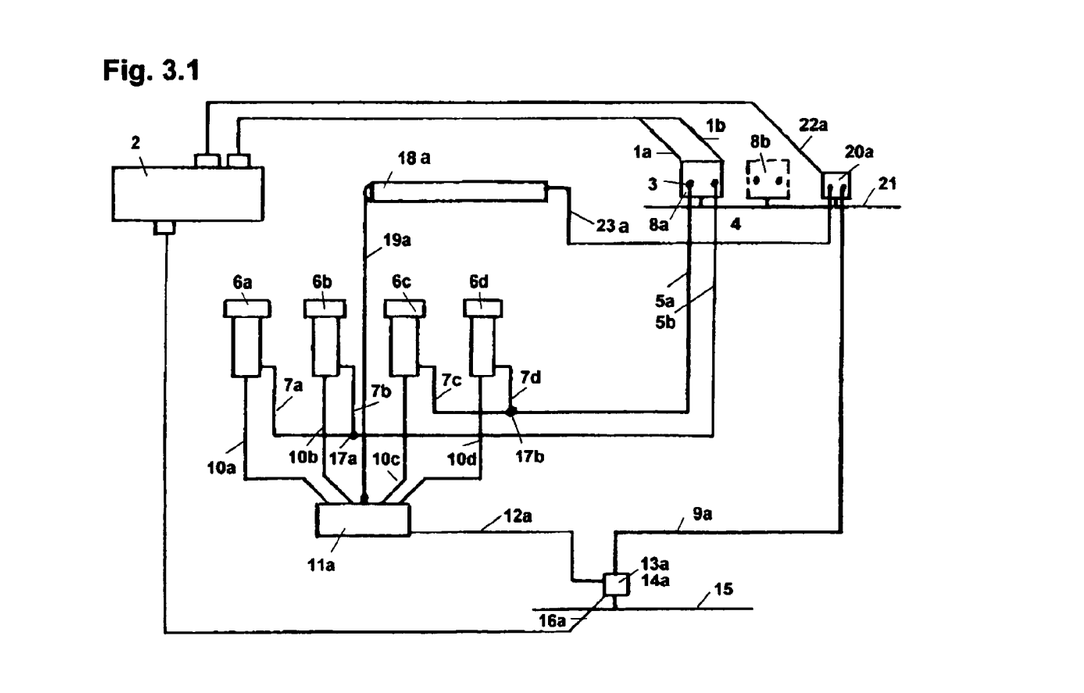

With reference to FIG. 3.1 another embodiment according to the invention will now be described. In this embodiment the electronic control device 2 provides for thresholds and check and waiting times to be set separately for the fore and the rear quarters 54 to 57.

A milk flow sensor 13a captures the milk flows from all of the teats. The electronic control device 2 in the embodiment according to the invention emits two activation signals. This means, as the milk flow falls below e.g. 300 g/min. and preset check and waiting times have elapsed, a first activation signal is emitted, and as the milk flow falls below e.g. 200 g/min. and preset check and waiting times of e.g. 20 s have elapsed, a second activation signal is emitted.

Other thresholds than the preferred thresholds indicated above can certainly be set as well. Care should be taken, however, that the first threshold for the first activation signal lie above the threshold for generating the second activation signal.

Now there are the following options depending on the technical equipment of a milking installation to control the subsequent milking process by way of said two activation signals:

A first option would be to cut off the pulse at the pair of fore teats and then at the rear teats.

In installations not equipped with an automatic milking unit removal apparatus 18a, e.g. the first activation signal cuts off the current of the magnetic coil of the pulsator 8a in the pressure phase by means of the control cable 1b, which magnetic coil supplies atmospheric pressure or vacuum to the teat cups e.g. of the fore quarters. In this way the milking process is interrupted at the fore quarters 54, 55. The teat cups, however, remain in place on the fore teats.

While milking continues at the rear quarters, the magnetic coil of the pulsator 8a for the pair of fore teats 58 could be turned on/off at adjustable intervals for extracting from the fore teats any milk produced in the meantime.

With the second activation signal the milking process is interrupted at the rear quarters 56, 57 and simultaneously an optical (or acoustic) signal is emitted to indicate to the milker that the milking unit can be taken off.

In installations equipped with an automatic removal apparatus 18a the pulse is cut off at the fore pair of teats 58 and thereafter all of the four teat cups are taken off, based on the two activation signals.

With the first activation signal by means of the control cable 1b the current is cut off in the pressure phase in the magnetic coil of the pulsator 8a which supplies atmospheric pressure or vacuum to the teat cups of the fore quarters 54, 55. In this way the milking process is interrupted at the fore teats. The teat cups, however, remain in place on the teats.

With the first activation signal a stripping aid, if any, for the rear quarters 56, 57 may be activated as well.

With the second activation signal the control valve 20a is activated via the control cable 22a. In this way, atmospheric pressure is conveyed to the pneumatic shut-off apparatus 14a by means of the vacuum line 9a and thus the milking vacuum directed towards the teat cups 6a, 6b, 6c, 6d is shut off. At the same time vacuum is conveyed to a conventional removal apparatus 18a by means of the vacuum line 23a and the milking unit is pulled off by means of the pulling rope 19a. The milking process is terminated.

With this method the milking process can be controlled separately for the fore and rear quarters 54 to 57 using one milk flow sensor 13a only.

The electrodes of the milk flow sensor 13a, by means of which the milk flow is captured, are connected to the electronic control device 2 by means of control cable 16a.

Specific embodiments may provide for the sequence of interruptions or termination of milking to be adjustable. Also, automatic switching is possible based e.g. on detection by sensor.

Figure 41:
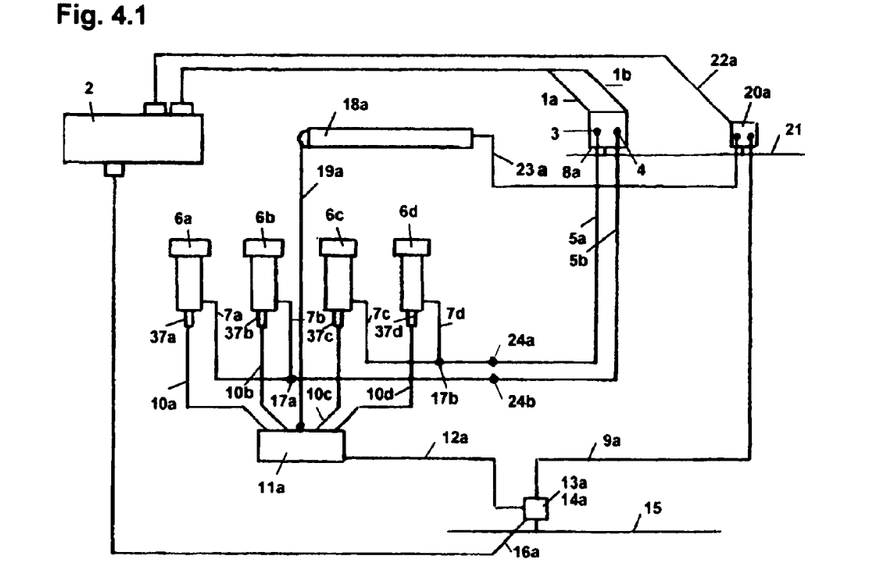

FIG. 4.1 shows a schematic illustration of another embodiment of an apparatus for milking according to the invention. In this embodiment the milking process can be interrupted as needed at the fore or rear pair of teats 58, 59 as the milk flow decreases by way of manually operating the shut-off and ventilating apparatuses 24a, 24b disposed in the long pulse hoses 5a, 5b (similar effect to pulse shut-off).

Figure 42:
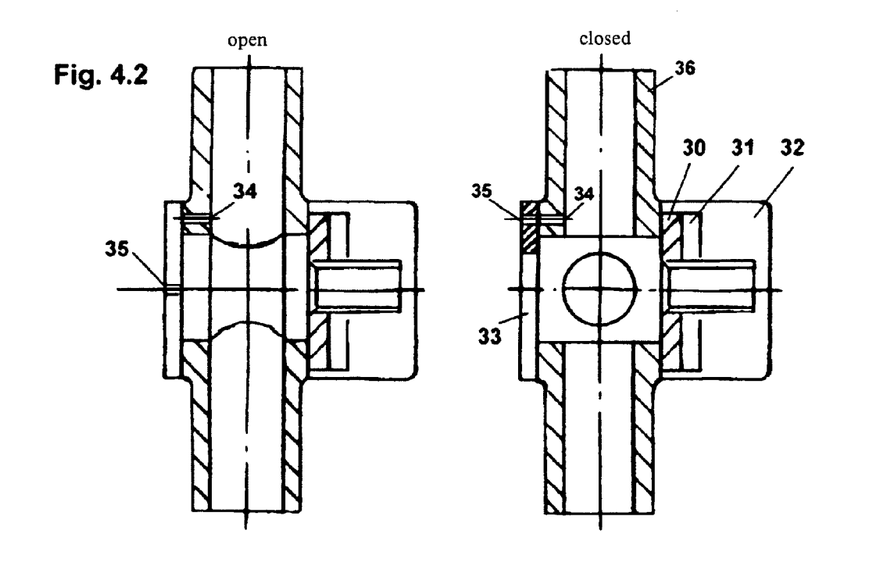

For example with the control knob 32 of the shut-off and ventilating apparatus 24b being in the "open" position, pulsating atmospheric pressure or vacuum from the pulsator 8a is conveyed into the pulsation chamber of the teat cups 6a, 6b and the opening 34 of the valve body 36 is closed (see FIG. 4.2).

When the milker, looking at any milk sight glass 37a, 37b e.g. of the fore pair of teat cups—or a transparent short milk hose 10a, 10b, observes a very low milk flow from any teat, he switches the valve body 33 to the "closed" position by means of the control knob 32 of the shut-off and ventilating apparatus 24b. In this position the opening 35 of the valve body 33 is aligned precisely with the position of the opening 34 of the valve body 36.

In this way atmospheric pressure is conveyed to the pulsation chamber of the respective teat cups 6a, 6b while simultaneously the vacuum supply from the pulsator 8a to the teat cups 6a, 6b is shut off. The pulsator is not deactivated.

Also there is the option to incorporate one shut-off and ventilating apparatus each in the short pulse hoses (7a, 7b, 7c, 7d).

The applicant reserves the right to claim as essential to the invention any and all of the features disclosed in the present application documents.

LIST OF REFERENCE NUMBERS 1a, 1b, 1c, 1d control cable (to the pulsator)
2 electronic control device
3 hose connection pulsator L
4 hose connection pulsator R
5a, 5b, 5c, 5d long pulse hose
6a, 6b, 6c, 6d teat cup
7a, 7b, 7c, 7d short pulse hose
8a, 8b pulsator
9a, 9b vacuum line (to milk flow sensor)
10a, 10b, 10c, 10d short milk line
11a, 11b volumetric collecting device
11c, 11d Y-piece
12a, 12b, 12c, 12d long milk line
13a, 13b milk flow sensor (or measuring chamber of a milk yield measuring device)
14a, 14b shut-off apparatus
15 milking line
16a, 16b control cable (to milk flow sensor)
17a, 17b connector pulse hose
18a, 18b removal apparatus
19a, 19b pulling rope
20a, 20b, 20c control valve
21 vacuum line
22a, 22b, 22c control cable (to the control valve)
23a, 23b vacuum line (to the removal apparatus)
24a, 24b shut-off and ventilation apparatus
25 apparatus for receiving two pairs of teat cups
26 teat cup catching device
27a, 27b flexible connection
28a, 28b, 28c, 28d opening
29 supporting arm
30 sealing plate
31 spring component
32 control knob
33 valve body
34 opening in the valve case
35 opening in the valve body
36 valve case
37a, 37b, 37c, 37d milk sight glass
38 4/2 directional valve
50 cow
51 head
52 tail
53 udder
54 fore udder quarter, left
55 fore udder quarter, right
56 rear udder quarter, left
57 rear udder quarter, right
58 fore udder half
59 rear udder half
a position of the 4/2 directional valve, magnetic coil currentless or deenergized
b position of the 4/2 directional valve, magnetic coil excited

The invention claimed is:

1. Apparatus for milking a dairy animal having a first pair of teats and a second pair of teats, the apparatus comprising:
   a first teat cup assembly for performing a milking process on the first pair of teats, the first teat cup assembly comprising;
   a first pair of teat cups,
   a first pair of liners, and each liner is disposed at least partially inside a corresponding teat cup to define a pulsation chamber therebetween,
   a first pair of pulse hoses, each pulse hose is in fluid communication with a corresponding pulsation chamber, and
   a first shut-off device in communication with the first pair of pulse hoses, the first shut-off device having an open position during the milking process and a closed position that interrupts the milking process;
   a second teat cup assembly for performing a milking process on the second pair of teat the second teat cup assembly comprising;
   a second pair of teat cups,
   a second pair of liners, and each liner is disposed at least partially inside a corresponding teat cup to define a pulsation chamber therebetween,
   a second pair of pulse hoses, and each pulse hose is in fluid communication with a corresponding pulsation chamber;
   a milk flow detection device that indicates whether the first shut-off device should be in the open position or closed position based on the quantity of milk flowing from the first teat cup assembly; and
   a second shut-off device having an open position during the milking process and a closed position that interrupts the milking process in response to the quantity of milk flowing from the second teat cup assembly.

2. The apparatus of claim 1, wherein the first shut-off device moves from the open position to the closed position based on a first activation signal while the second shut-off device remains in the open position.

3. The apparatus of claim 1, and further comprising:
a controller for receiving data from the milk flow detection device and the controller converts that data to control whether the first shut-off device is in the open position or closed position.

4. The apparatus of claim 1, wherein the first shut-off device moves from the open position to the closed position before the second shut-off device moves from the open position to the closed position, and the apparatus further comprises:
a controller for receiving data from the milk flow detection device and the controller converts that data to control whether the first shut-off device is in the open or closed position.

5. The apparatus of claim 1, wherein the milk flow detection device senses milk flowing from the first pair of teats during the milking process.

6. The apparatus of claim 1, wherein the milk flow detection device senses milk flowing from the first pair of teats and the second pair of teats during the milking process.

7. The apparatus of claim 1, wherein the milk flow detection device includes:
an observation window, and the first shut-off device is manually operable.

8. The apparatus of claim 1, and further comprising:
a milk line shut-off device in communication with the first teat cup assembly, and the milk line shut-off device has an open position permitting milk to flow through a milk line during the milking process in the first teat cup assembly, and a closed position that shuts off vacuum in the milk line so the first teat cup assembly is detached from the first set of teats.

9. The apparatus of claim 1, and further comprising:
a milk line in fluid communication with the first teat cup assembly; and
a milk line shut-off device in communication with the milk line and the first teat cup assembly, and the milk line shut-off device has an open position permitting milk to flow through the milk line during the milking process in the first teat cup assembly and shuts off vacuum in the milk line so the first teat cup assembly is detached from the first set of teats while the second teat cup assembly is not detached from the second set of teats.

10. A method for milking a dairy animal having a first pair of teats and a second pair of teats, the method comprising the steps of:
performing a milking process on the first pair of teats with a first teat cup assembly, the first teat cup assembly comprising;
a first pair of teat cups, and
a first pair of liners, and each liner is disposed at least partially inside a corresponding teat cup to define a pulsation chamber therebetween;
applying pulsation to the pulsation chambers of the first teat cup assembly through a first pair of pulse hoses, each pulse hose is in fluid communication with a corresponding pulsation chamber;
milking the first pair of teats by opening a first shut-off device;
interrupting the milking process by closing the first shut-off device;
performing a milking process on the second pair of teats with a second teat cup assembly, for the second teat cup assembly comprising;
a second pair of teat cups, and
a second pair of liners, and each liner is disposed at least partially inside a corresponding teat cup to define a pulsation chamber therebetween;
applying pulsation to the second teat cup assembly pulsation chambers through a second pair of pulse hoses; and
detecting milk flow quantities from the milking process with a milk flow detection device; and
opening or closing a second shut-off device based on the milk flow during the milking process.

11. The method of claim 10, and further comprising the steps of:
opening a second shut-off device during the milking process and interrupting the milking process by closing the second shut-off device; and
detecting milk flow data to be used to determine whether the first shut-off device should be in the open position or the closed position.

* * * * *